Feb. 24, 1925.
S. A. WELLMAN ET AL
1,527,766
CARCASS HOLDING DEVICE
Filed June 7, 1924
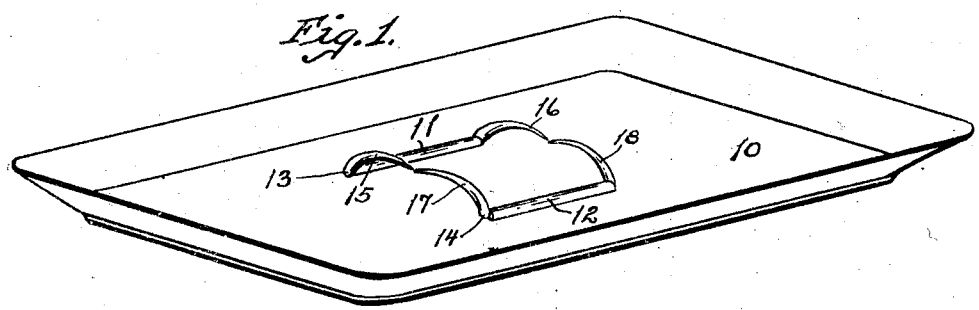
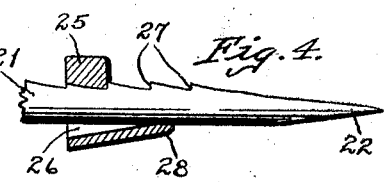
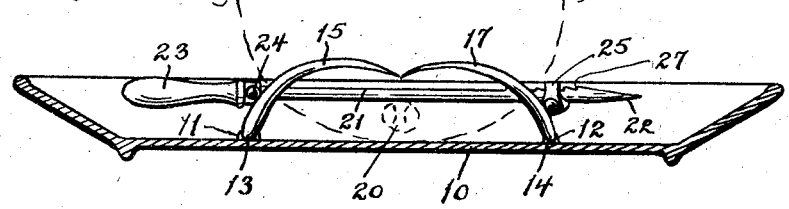
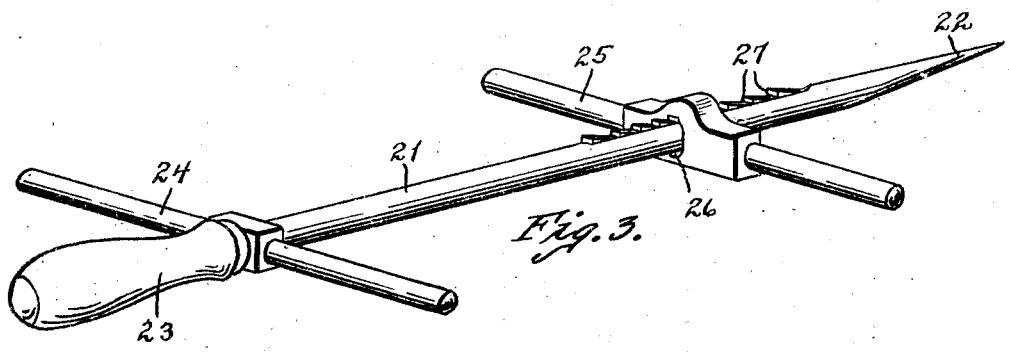
INVENTORS
S. A. WELLMAN AND
BERNARD MENNENGA
BY Earl M. Sinclair
ATTORNEY Patented Feb. 24, 1925.

1,527,766

UNITED STATES PATENT OFFICE.

SETH A. WELLMAN AND BERNARD MENNENGA, OF MASON CITY, IOWA.

CARCASS-HOLDING DEVICE.

Application filed June 7, 1924. Serial No. 718,637.

*To all whom it may concern:*

Be it known that we, SETH A. WELLMAN and BERNARD MENNENGA, each a citizen of the United States of America, and resident of Mason City, Cerro Gordo County, Iowa, have invented a new and useful Carcass-Holding Device, of which the following is a specification.

The object of this invention is to provide improved means for securely holding a carcass, such as that of a fowl, during the operation of carving.

A further object of this invention is to provide an improved article of manufacture constituting an attachment or accessory to a platter or the like and designed for gripping and holding a carcass thereon while being carved.

Our invention consists in the construction, arrangement and combination of elements hereinafter set forth, pointed out in the claims and illustrated by the accompanying drawing, in which—

Figure 1 is a perspective view illustrating a platter or salver equipped with our improvement as an attachment thereto. Figure 2 is a cross-section, on an enlarged scale, illustrating the attachment in position for practical use, the outline of a carcass being shown by dotted lines. Figure 3 is a perspective view, on an enlarged scale, showing the skewer device which may be employed, and Figure 4 is a detail elevation of a portion of the same, partly in section.

In the drawings, the numeral 10 designates generally a dish, such as a platter, salver or trencher, commonly employed to contain the carcass of a fowl for carving and serving. Our devices may be attached to any suitable support; in some cases, especially where the platter 10 is of metal, they may be carried directly by such member; or they may be attached to a base of wood or the like which may be set loosely in the platter, and the platter is here represented merely as one form of base or support for the devices.

Mounted on and fixed to the base or support 10 are spaced, parallel longitudinally arranged bearings 11, 12, and in said bearings rock shafts 13, 14 are mounted for oscillation. Formed on or fixed to the ends of the rock shaft 13 are attenuated arms or prongs 15, 16, preferably curved between their ends, and similar prongs 17, 18 are formed on or fixed to the respective ends of the rock shaft 14. The bearings 11, 12 are so arranged, and the prongs 15, 16, 17, 18 so shaped and arranged, that the points of the latter will extend substantially to the center line of the device, or to a line midway between said bearings, when turned inwardly toward each other.

In practical use of the devices so far described, a carcass such as 19, dotted lines Figure 2, is placed on the support, and is arranged longitudinally thereof and between the bearings 11, 12, the rock shafts having first been turned so that the prongs extend outwardly from the bearings. Then the rock shafts are turned manually and the prongs 15, 16 on one side and 17, 18 on the other are caused, by manual pressure, to penetrate the sides of the carcass; or the engagement of the prongs may be secured by resting the carcass on the upturned points of the prongs and then causing them to penetrate by downward pressure on the carcass. When the engagement is effected the prongs extend from opposite sides approximately to the median line of the carcass as indicated in Figure 2 and their points lie substantially above the backbone 20, so that the carcass is effectively held against longitudinal or lateral or upward movement relative to the support and the carving operation is greatly facilitated.

In addition a skewer device may be employed if desired, comprising a shank 21 having a sharp point 22 at one end and provided with a handle 23 at the opposite end. The skewer device also may be provided with a cross-bar 24 at a point between or near the shank and handle 23. The skewer may be caused to penetrate the carcass 19 transversely, the point 22 being inserted between one pair of prongs, such as 15, 16 and passed transversely through the carcass, emerging between the other pair of prongs, such as 17 and 18, the shank 21 extending across and above the back-bone 20. The shank preferably is inserted until the cross-bar 24 engages the prongs 15, 16 and may be caused to forcibly contact them and cause them to more deeply penetrate the carcass and also serve to prevent accidental withdrawal of the prongs. A separate cross-head 25 also may be employed, having a central aperture 26 therethrough, by means of which it may be mounted on the pointed end of the skewer after it has been inserted through the carcass, and said cross-head moved inwardly on the shank 21 until it engages the prongs 17, 18, having a function relative thereto similar to the function of the cross-bar 24 relative to the opposite prongs. The shank 21 may further be formed with ratchet teeth 27 on the face, near and extending inwardly from the point 22, to selectively engage the outer face of the cross-head 25 after it has been mounted on the shank, to prevent accidental withdrawal or removal of the cross-head, as clearly indicated in Figure 4. Thus the carcass is securely held to the support and the prongs held in their securing positions by the skewer device with its cross-bar and ratcheted cross-head. If desired the cross-head 25 may be formed on one side with an extended inclined lip 28 to engage the shank 21 opposite to the ratchet teeth 27 at a point slightly spaced from the tooth which engages the edge of the cross-head hole 26, to prevent accidental disengagement by straight outward pressure on the cross-head.

We claim as our invention:—

1. A carcass-holding device, comprising a base, a pair of bearings spaced apart thereon, rock shafts journaled in said bearings, prongs on said rock shafts adapted to engage and penetrate a carcass placed between said bearings, and a skewer adapted to penetrate the carcass auxiliary to said prongs, said skewer being provided with means for engaging and preventing withdrawal of said prongs.

2. A carcass-holding device, comprising a base, a pair of bearings spaced apart thereon, rock shafts journaled in said bearings, and a pair of integral attenuated prongs on each of said rock shafts formed by bending end portions thereof substantially at right angles and curving such bent portions between their ends, said prongs adapted to penetrate a carcass from opposite sides.

3. A carcass-holding device, comprising a base, a pair of bearings spaced apart thereon, rock shafts journaled in said bearings, prongs on said rock shafts adapted to engage and penetrate a carcass placed on said base between the bearings, and means engaging the outer faces of said prongs to prevent outward movement thereof.

4. A carcass-holding device comprising a base, a pair of bearings spaced apart thereon, rock shafts journaled in said bearings, prongs on said rock shafts adapted to engage and penetrate a carcass placed on said base between the bearings, a skewer device adapted to penetrate the carcass transversely and formed with a cross-bar to engage the prongs on one side thereof, and a cross-head adapted to be mounted on the opposite end of the skewer and engage the prongs on the opposite side of the carcass.

5. A carcass-holding device comprising a base, a pair of bearings transversely spaced thereon, rock shafts journaled in said bearings, prongs on said rock shafts adapted to engage a carcass placed on said base between the bearings, a skewer device adapted to penetrate the carcass transversely and extend therethrough and formed near one end with a cross-bar adapted to engage the prongs on one side of the carcass, and a cross-head adapted to be mounted on said skewer and engage the prongs on the opposite side of the carcass, said skewer being formed with ratchet teeth adapted to engage and prevent accidental removal of said cross-head.

Signed at Mason City, in the county of Cerro Gordo and State of Iowa, this 11th day of April, 1924.

SETH A. WELLMAN,
BERNARD MENNENGA.